(12) United States Patent
Schunder

(10) Patent No.: US 8,525,694 B2
(45) Date of Patent: Sep. 3, 2013

(54) RADIO FREQUENCY IDENTIFICATION OBJECT TRACKING

(75) Inventor: Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 12/974,062

(22) Filed: Dec. 21, 2010

(65) Prior Publication Data

US 2012/0154174 A1 Jun. 21, 2012

(51) Int. Cl.
*G08G 1/00* (2006.01)

(52) U.S. Cl.
USPC ............................ 340/901; 340/905; 340/438

(58) Field of Classification Search
USPC ................................................. 340/901, 905
See application file for complete search history.

(56) References Cited

U.S. PATENT DOCUMENTS

| | | | |
|---|---|---|---|
| 6,472,978 B1 * | 10/2002 | Takagi et al. | 340/435 |
| 8,145,385 B2 * | 3/2012 | Hayakawa et al. | 701/42 |
| 2005/0073438 A1 * | 4/2005 | Rodgers et al. | 340/944 |
| 2009/0002193 A1 * | 1/2009 | Cemper | 340/901 |
| 2010/0134263 A1 * | 6/2010 | Mathony et al. | 340/435 |

OTHER PUBLICATIONS

Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.

* cited by examiner

*Primary Examiner* — Kerri McNally
(74) *Attorney, Agent, or Firm* — Jennifer M. Stec; Brooks Kushman P.C.

(57) ABSTRACT

A computer-implemented method includes detecting, through an RF transceiver in communication with a vehicle computing system, the proximate presence of one or more RFID tags. The method also includes determining, via the vehicle computing system, a type of potential hazard to which the detected tag corresponds. The method further includes notifying, via the vehicle computing system, a driver of the presence of the determined type of potential hazard.

18 Claims, 5 Drawing Sheets

RADIO FREQUENCY IDENTIFICATION OBJECT TRACKING

TECHNICAL FIELD

The illustrative embodiments generally relate to tracking objects using radio frequency identification (RFID) in conjunction with a vehicle computing system.

BACKGROUND

With the onset of RFID technology and the relative inexpensive nature of including passive RFID tags in various products and objects, RFID has become a viable option for theft prevention, inventory management, personnel tracking, and even checkout at a store.

Generally, a complete RFID system includes both a transceiver and a transponder. The transponder is often a low-cost tag that can be cheaply included in packaging or in a label. Some RFID transponders are even printed directly onto a product or packaging with metallic ink.

The transceiver is typically included with a device designed to detect signals from the RFID transponders (RFID tags). The RFID tag, however, does not typically generate a receivable signal. Instead, the tag sits in a passive state, waiting to be energized by radiation. This radiation may be provided by an antenna, transmitted to energize the RFID tags.

Transmission of energy from the antenna "wakes up" a passive RFID tag and causes the tag to send an identifiable signal to the transceiver. The transceiver can then use the data sent from the tag to identify the object, and even, in some cases, identify the proximity of the object.

In addition to passive RFID tags, active RFID tags may also be included as tracking measures. These tags typically have a power source attached thereto, so that the tags can broadcast a signal without needing to be energized by an RFID antenna. Of course, since a power source also needs to be included with the tags, the cost of an active tag typically exceeds that of a passive tag.

In recent years, automotive manufacturers have sought numerous solutions to provide a safer driving experience. Rear-view cameras for reversing, impact sensors and warning systems, secondary side-view mirrors to show a blind spot—many different ideas have been implemented to attempt to prevent collisions. Unfortunately, some of these options, such as the rearview camera, are not typically implemented unless the driver is operating the vehicle in reverse. Accordingly, an unaware driver may not realize a vehicle, pedestrian, bicycle, etc. is in close-rear proximity and, in the event of, for example, a sudden braking of the vehicle, this could cause a collision. Alternatively, even a very aware driver may not notice the presence of a vehicle running without headlights or driving in very close proximity (such that the lights are below a rear-windshield line of sight) at night.

SUMMARY

In a first illustrative embodiment, a computer-implemented method includes detecting, through an RF transceiver in communication with a vehicle computing system, the proximate presence of one or more RFID tags. The illustrative method also includes determining, via the vehicle computing system, a type of potential hazard to which the detected tag corresponds. The illustrative method further includes notifying, via the vehicle computing system, a driver of the presence of the determined type of potential hazard.

In a second illustrative embodiment, a vehicle computing apparatus includes detecting programmed logic circuitry, to detect, through an RF transceiver in communication with the vehicle computing system, the proximate presence of one or more RFID tags. The vehicle computing apparatus also includes determining programmed logic circuitry to determine a type of potential hazard to which the detected tag corresponds. Further, the illustrative apparatus includes notifying programmed logic circuitry to notify a driver of the presence of the determined type of potential hazard.

In a third illustrative embodiment, a computer programmable storage medium stores instructions that, when executed, cause a vehicle computing system to perform the method including detecting, through an RF transceiver in communication with the vehicle computing system, the proximate presence of one or more RFID tags. The method the vehicle computing system is caused to perform also includes determining, via the vehicle computing system, a type of potential hazard to which the detected tag corresponds. The illustrative method further includes notifying, via the vehicle computing system, a driver of the presence of the determined type of potential hazard.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
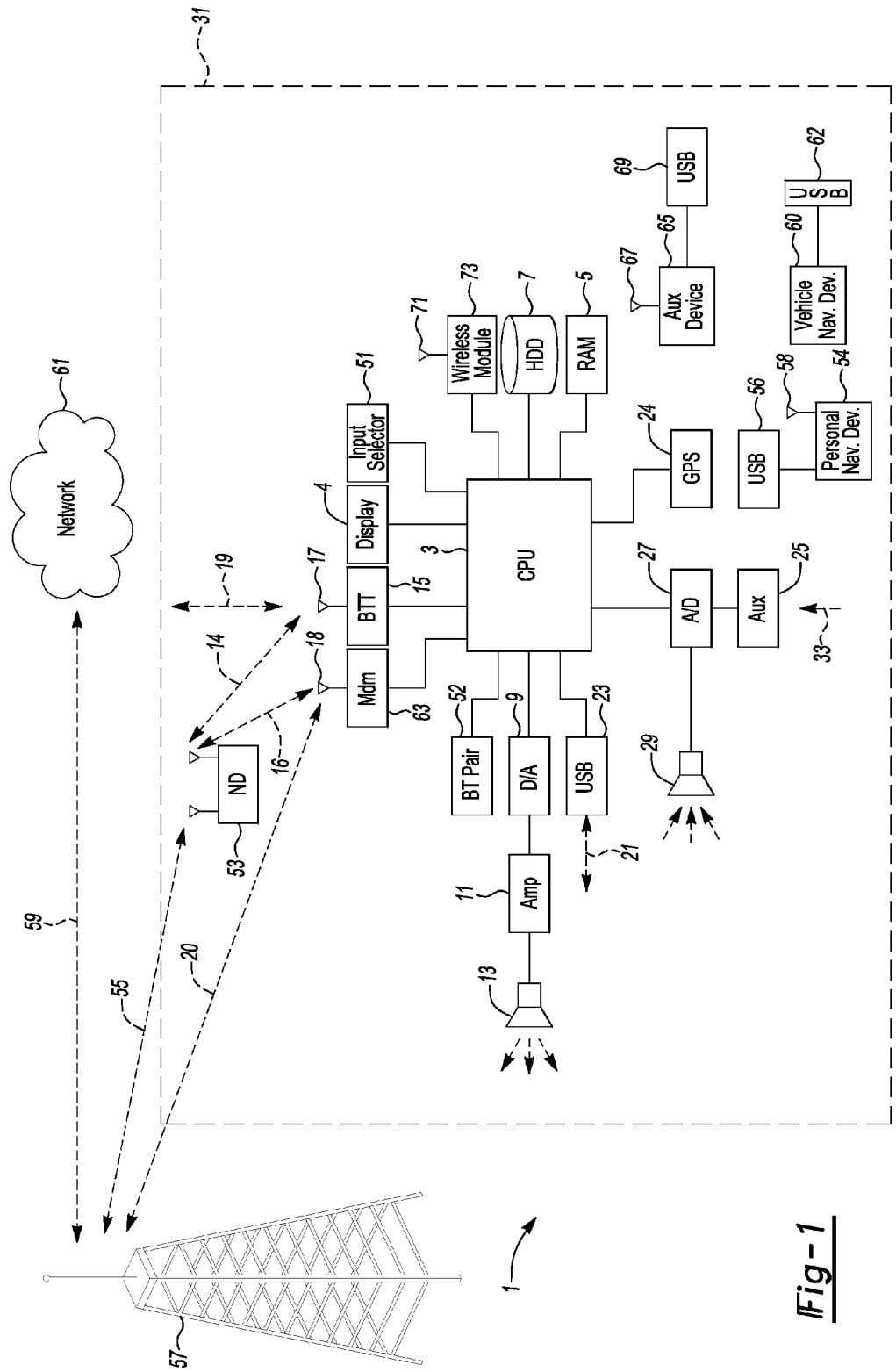
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bidirectional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
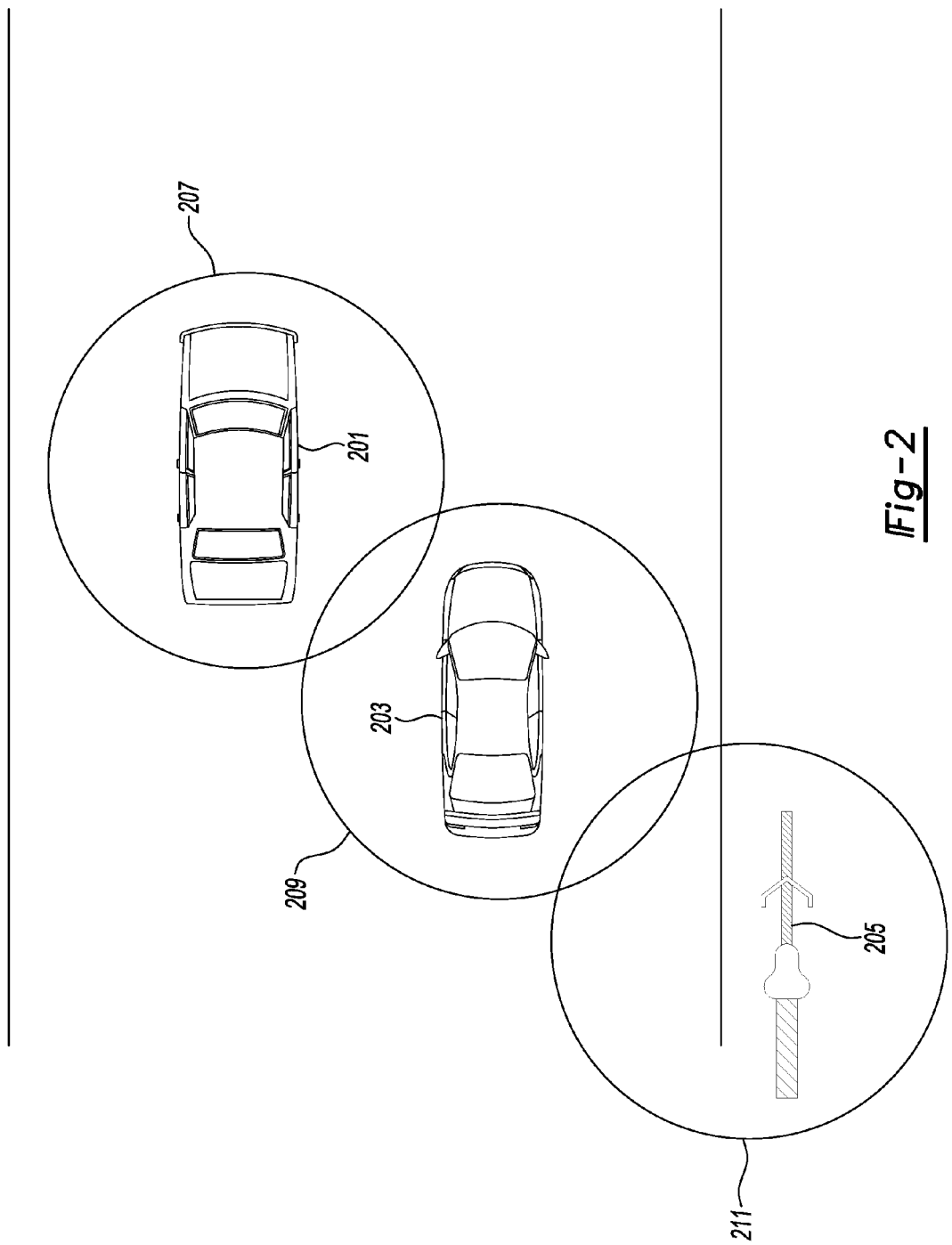
FIG. 2 shows an illustrative example of several objects equipped with RFID tags and/or transceivers.

FIG. 2 shows an illustrative example of several objects equipped with RFID tags and/or transceivers. In this illustrative embodiment, vehicles 201 and 203 are equipped with RFID transceivers. Although only a single transceiver is shown in this illustrative embodiment, a plurality of transceivers may also be used, as is discussed below.

As a result of being provided with the transceivers, the vehicles 201 and 203 have detection fields 207 and 209. These fields may also be determined by the strength of a signal coming from an RFID tag provided with a proximate tagged object. That is, objects capable of sending a stronger signal (from a further range) may increase the distance at which that object may be detected.

Also included in this example is a bicycle 205. The bicycle does not have a detection field, since it is simply provided with an RFID tag. Instead, the bicycle has a signal-broadcast-range 211. This range determines how proximate the bicycle must be to a receiver before the receiver will detect the signal from the bicycle.

By varying the strength of a responsive signal, greater detectability can be achieved. Passive RFID systems may be limited in their range, since their activation and responsiveness depends on the strength of the signal used to activate them. That is, a tag that would be capable of returning a signal sent at ten feet, will have an effective range of only five feet, if the broadcast energy to activate the tag is capable of traveling no further than five feet (since the tag will not even be activated outside that range).

Active RFID could be used, however, to boost the signal strength of the RFID tag (by self-powering) and thus achieve a greater range of detectability. Accordingly, a bicycle may have only a passive RFID tag system included therewith, since the bicycle does not naturally include a power-source. But a rider may elect to buy an active ID system, and the power could be provided from, for example, a battery, or even from the pedaling of the bicycle itself.

Vehicles equipped with one or more RFID tags may be able to take advantage of vehicle power systems to boost tag range, and thus act as active tags without requiring a power source not already included with the vehicle.

In the example shown in FIG. 2, it is assumed that the vehicles 201 and 203 are also both equipped with RFID tags, and that, for the sake of convenience, the RFID tag range of the vehicle is the same as the detection range. Thus the fields 207 and 209 also correspond to the RFID tag range.

In this illustrative, non-limiting example, vehicle 201 is capable of detecting the tag provided with vehicle 203, and vehicle 203 is capable of detecting the tags provided with both vehicles 201 and bicycle 205. Through the implementation of interpretation, detection and warning processes, non-limiting examples of which are provided herein, vehicles 201 and 203 are capable of providing advanced monitoring information to the drivers thereof, which may aid in collision avoidance.

Figure 3:
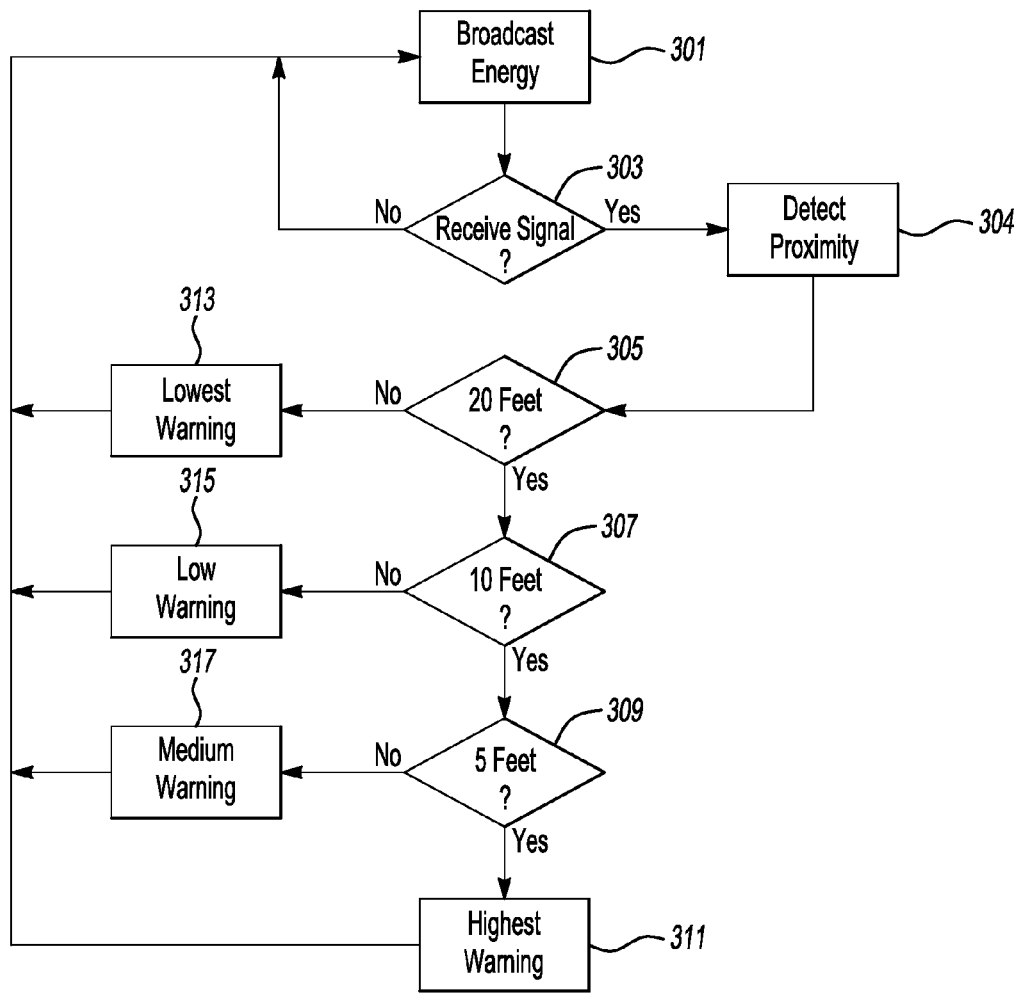
FIG. 3 shows an illustrative process for detecting proximity of an RFID tagged object and a warning strategy.

FIG. 3 shows an illustrative process for detecting proximity of an RFID tagged object and a warning strategy. In this illustrative embodiment, a vehicle computing system instructs an antenna to broadcast an RFID activation signal (or the antenna is simply constantly broadcasting the signal). If no signal is received responsively to the broadcast 303, it is assumed that no objects having RFID tags included therewith are within range of one or more vehicle transceivers.

In this embodiment, it is assumed that it is possible to determine the range to an RFID tag. If a signal is received by a transceiver, included with a vehicle computing system, the vehicle computing system determines the proximity to the particular RFID tag transmitting the signal 304.

If the RFID tag is further than 20 feet (or any other suitable distance away from the vehicle), the system provides the lowest level of warning 313. In this embodiment, the lowest level of warning may equate to simple information provision—such as, but not limited to "object X is detected at Y feet or greater." Although four levels of warning are discussed with respect to this embodiment, these levels are for exemplary purposes only. More levels or fewer levels may be provided, and the ranges may vary according to predetermined settings or be varied dynamically, such as in response to vehicle speed (e.g., when the vehicle is traveling at 25 miles per hour, 20 feet may be a "safe range", but when the vehicle is traveling at 60 miles per hour, 20 feet may be an "intermediate danger range").

In this illustrative embodiment, if the object is within 20 feet of the vehicle 305, the system checks to see if the object is within 10 feet of the vehicle 307. If the object is not within 10 feet of the vehicle, a low warning may be presented 315, indicating that an object is within a 10-20 foot range of the vehicle.

If the object is 10 feet away or closer 207, the system may check to see if the object is within 5 feet of the vehicle 309. If the object is not within 5 feet of the vehicle, the system may present an intermediate warning that a detected object is within 510 feet of the vehicle 317. Since this is a relatively close range, there may also be a safety related action taken in conjunction with this warning.

If the object is closer than 5 feet from the vehicle 309, the system may provide a highest level of alert 319. Again, since a collision may be imminent at such a proximity, the system may also take some form of corrective action in conjunction with the warning.

This detection can be done for numerous different objects simultaneously. In this manner, it may be possible for a system to detect and warn a driver of all objects within a certain proximity of a vehicle. Certain objects may be filtered out, based on vehicle/object type, vehicle location, speed, etc. Generally, however, a comprehensive picture of the proximate driving environment may be formed.

For example, if a vehicle was traveling at sixty miles per hour and was currently located on a highway, a driver may not be warned about the presence of other motor vehicles (or at least other cars and trucks) unless those vehicles are within 5 feet or less. This prevents an overload of constantly changing information, especially during, for example, rush hour traffic (time of day and known traffic patterns can also be incorporated into a filtering algorithm). But the driver may be notified about the proximity of, for example, motorcycles that are within 20 feet (since a collision with a motorcycle at such speeds is more likely to result in fatality, and since motorcycles may be likely to accelerate and change position in traffic more frequently than other vehicles). Similarly, if there is someone riding a bicycle along the highway, notification may be had at maximum range, since a collision with such a rider at sixty miles an hour is almost certain to result in a severe injury.

Of course, the vehicles for which warning is provided must have RFID tags associated therewith, in order for a responsive signal to be received therefrom.

Figure 4:
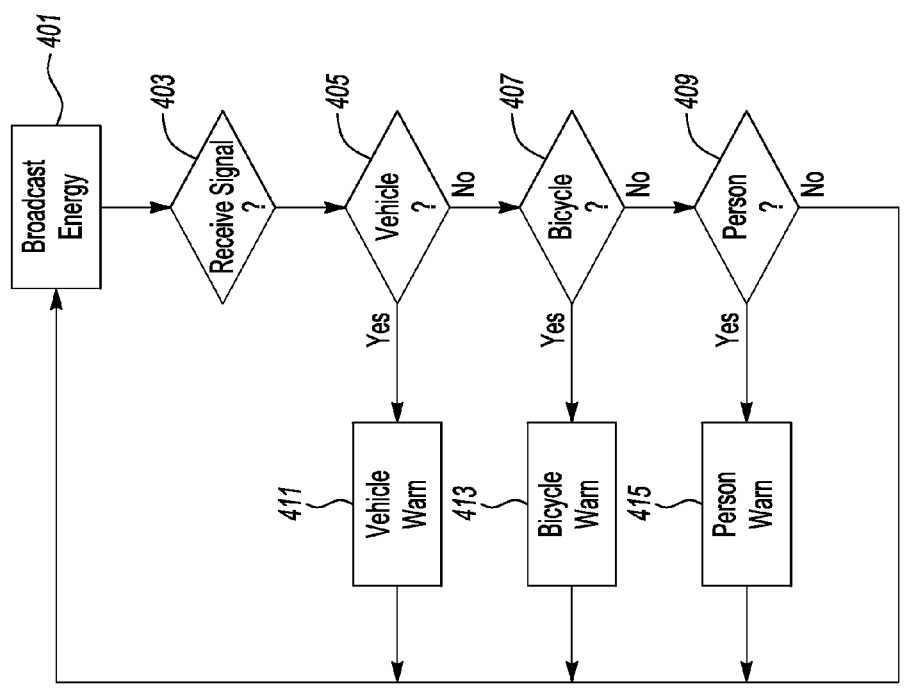
FIG. 4 shows an illustrative process for detecting proximity of an RFID tagged object and an identification strategy.

FIG. 4 shows an illustrative process for detecting proximity of an RFID tagged object and an identification strategy. In this illustrative embodiment, the vehicle computing system determines which types of objects are associated with various RFID tags.

In this illustrative embodiment, the vehicle computing system instructs an antenna to broadcast an energized signal to awaken passive RFID tags 401. As previously noted, the signal could also be continuously broadcast, or the RFID tags could be active in nature. If a signal is received from an RFID tag 403, the vehicle computing system determines the type of object associated with the signal.

By varying tags associated with different objects, it is possible to determine which RFID signals are associated with which types of objects. Although there may not currently be a convention for this, it is envisioned that the applicability of this type of system may result in a standardization. Additionally or alternatively, the provider of the RFID transceivers in the vehicles could self-standardize within the vehicles it manufactures, and further could provide additional types of tags for use with objects (bicycles, runners, etc.) that it does not manufacture.

If the received signal corresponds to a car 405 (truck, SUV, etc.), the system provides an appropriate indicator of a car (if needed), and takes appropriate steps given that the object is a car 411, and possibly also based on the proximity of the car.

Similarly, if the received signal corresponds to a bicycle 407 or a pedestrian 409, the vehicle computing system can take the appropriate steps for these objects respectively 413, 415. If the signal is not known, in this embodiment, the system errs on the side of caution and assumes that the signal corresponds to a pedestrian, although numerous default actions may be defined.

Figure 5:
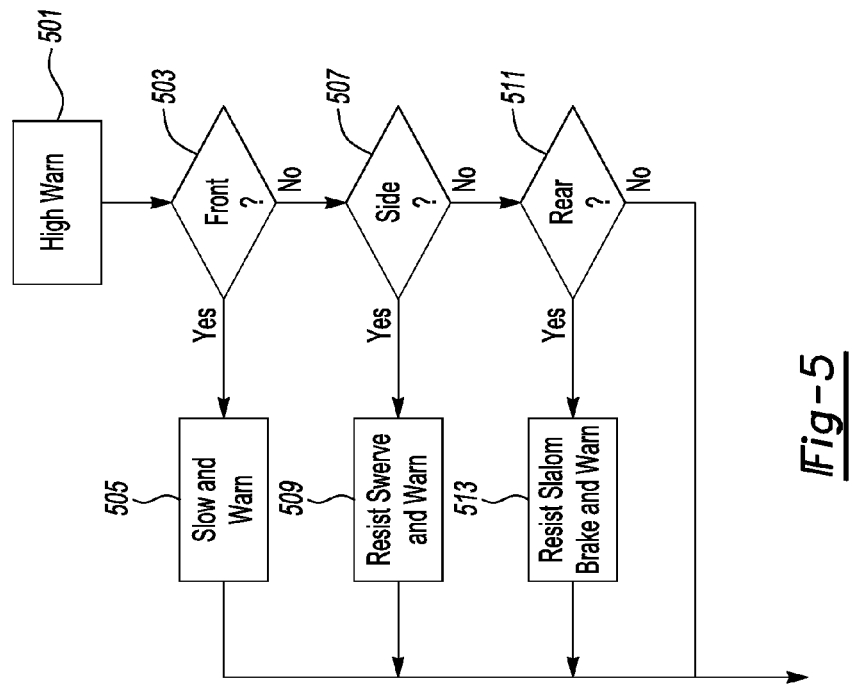
FIG. 5 shows an illustrative process for an illustrative warning process and automatic corrective action.

FIG. 5 shows an illustrative process for an illustrative warning process and automatic corrective action. FIG. 5 shows an illustrative embodiment of a vehicle computing system reacting to the presence of various types of received RFID signals. In this illustrative embodiment, a high state of warning 319 has been determined to be appropriate. These actions could be taken under any condition, but in this embodiment the system has determined that a high possibility of collision exists, and reacts accordingly.

In this embodiment, the vehicle computing system is also capable of determining a relative position of a detected object. One non-limiting strategy for such determination is shown with respect to FIG. 6.

In this illustrative embodiment, if the signal is detected as coming from the front of the vehicle 501, the vehicle computing system causes the vehicle to slow 503 (assuming that such an action is a safe action to be taken). Additionally or alternatively, the system may warn the driver that a tag is within a certain proximity to the front of the vehicle. This could be useful, for example, if the driver looks away from the road for a second and a vehicle in front of the driver slams on its brakes.

Also, in this illustrative example, if the vehicle computing system detects that a detected object exists to the side of a vehicle 505, in close proximity, the system may resist a sharp swerve to the side 507. Again, the feasibility of this solution must be considered in conjunction with the reasonableness of limiting a driver's ability to swerve.

As with the forward object detection, the system may also warn the driver of the existence of the object, and may, for example, reiterate the warning as the swerve occurs, so as to at least notify the driver of the close proximity of the object to the side.

If the vehicle detects an object to the rear in close proximity 509, the vehicle computing system may again warn the driver, and may resist sharp braking. Again, however, the reasonableness of the resistance should likely be balanced against the likelihood that such resistance may cause a different or more serious collision. As with the previous conditions, it may at least be advisable to reiterate a warning if the sharp braking occurs, so as to inform the driver of the likelihood of danger.

Figure 6:
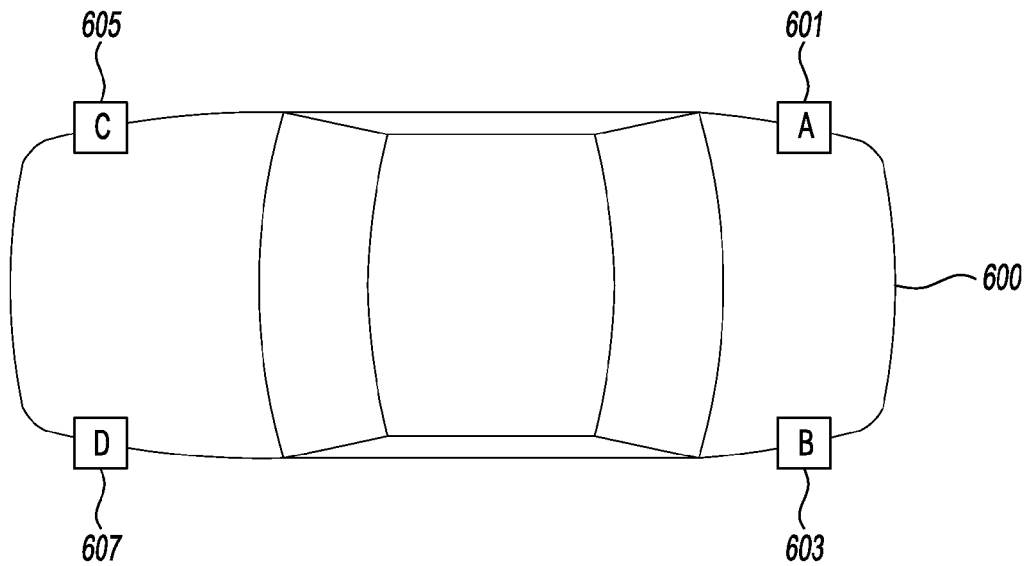
FIG. 6 shows illustrative placement of RFID transceivers.

FIG. 6 shows illustrative placement of RFID transceivers. In this illustrative embodiment, a vehicle 600 is provided with four transceivers 601, 603, 605 and 607. This is simply one non-limiting placement option for transceivers. For example, it may be the case that a transceiver can unilaterally detect RFID position information, and thus a triangulation advantage of multiple receivers may not be desired.

In this embodiment, four receivers are placed at the four corners of the vehicle. Based on one illustrative strategy for RFID detection, the presence of an RFID tag can generally be known. Further, even if the system is not generally capably of determining the distance to an RFID tag from a receiver, a reasonable guess about a minimum distance may be made based on the detection/non-detection of a signal at each receiver.

For example, in the system shown in FIG. 6, RFID transceivers A 601, B 603, C 605 and D 607 are provided in the locations shown. In the case where the transceivers are all capable of detecting the distance to a received signal, the system can determine the location/direction of the object sending the signal, based on the order of proximity to the various transceivers.

For example, without limitation, if the signal is closest to transceiver A, then to B, then to C, then to D, it can be assumed that the object equipped with the RFID tag is located to the front left of the vehicle. If the object is closest to transceiver A, then to transceiver C, then to transceiver B, then to D, it can be assumed that the object is to the left side of the vehicle, likely within a forward quadrant (if the vehicle is divided into quarters). This determination can be extrapolated for each possible grouping of four (or fewer, or more) transceivers in order to determine object location.

In a variation, it may not be possible to determine object proximity based on a received signal. In such an illustrative embodiment, if it was known, for example, that passive tags would only activate within ten feet of a transceiver (and possibly a corresponding antenna), then a signal received at A, but not at any other transceiver, could be determined to be more than 10 feet from all other transceivers, but within 10 feet of A, and thus a limited guess at the location of the object could be known. Similarly, a signal received at A and C, but not at B or D could be estimated to be within an area to the left of the vehicle, at least a minimum distance from both B and D. This would at least provide a means of approximating a location and distance of a received signal, and allow the vehicle or driver to react accordingly.

It may also be possible to display the locations of various objects, or indicators representing the locations, to a driver. For example, if an object was detected to be within a few feet to either side of the vehicle, an indicator light could be lit on a corresponding side-view mirror. Similarly, a tailgating vehicle could cause an indicator light to appear on a rearview mirror. Or a vehicle navigation display could display indicators (or a complex graphic) of the location of various proximate detected objects.

Figure 7:
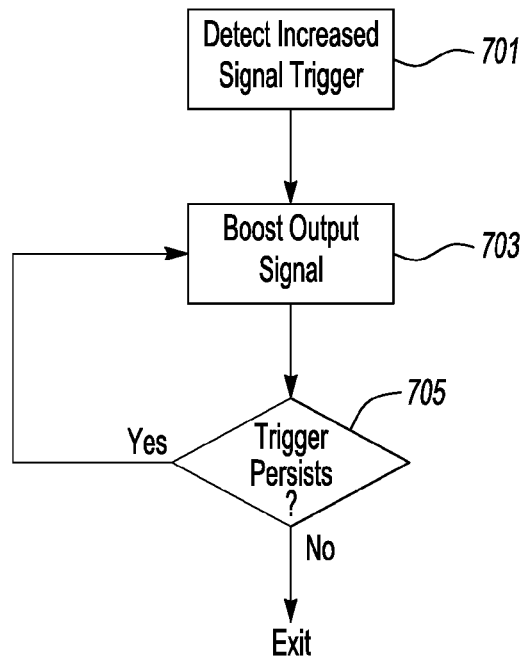
FIG. 7 shows an illustrative example of a system having a plurality of detection ranges, variable by a vehicle computing system.

FIG. 7 shows an illustrative example of a system having a plurality of detection ranges, variable by a vehicle computing system. In this illustrative embodiment, it is possible to boost the signal strength of an antenna to increase the range of detectability. In this embodiment, the vehicle computing system determines (or is told by an occupant) that a hazardous condition is present 701. This condition could be the result of weather, a night-driving condition, or even a drowsy driver.

Based on the severity of the condition, the system may boost the signal to a corresponding range 703. It may be desirable to balance this boost with other factors as well. For example, a high strength signal on a highway may result in numerous identifications, due to the volume of traffic. This may tend to marginalize meaningful identifications. Accordingly, these additional variables may be taken into account when adjusting the signal strength.

As long as the condition persists 705, the increased signal strength is maintained.

Although this invention has been described in terms of illustrative embodiments, these were provided for exemplary purposes only, and were not intended to limit the scope of the invention in any way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    detecting, through an RF transceiver communicating with a vehicle computing system (VCS), the proximate presence of an RFID tag;
    determining, via the VCS, a hazard type associated with the detected tag;
    notifying a driver of the hazard; and
    adding resistance against an attempted braking action that is determined to likely bring the vehicle in contact with the hazard.

2. The method of claim 1, wherein the potential type of hazard is another vehicle.

3. The method of claim 1, wherein the potential type of hazard is a bicycle or a pedestrian.

4. The method of claim 1, wherein the determining further includes determining a proximity of the detected RFID tag.

5. The method of claim 4, wherein the notifying further includes notifying the driver of the determined proximity of the detected RFID tag.

6. The method of claim 4, wherein the proximity is determined to be within a range.

7. The method of claim 4, wherein the proximity is determined as an actual value.

8. The method of claim 1, wherein the determining further includes determining a direction, with respect to the orientation of a vehicle which the driver is driving, of the detected RFID tag.

9. The method of claim 8, wherein the notifying further includes notifying the driver of the determined direction of the detected RFID tag.

10. The method of claim 1, further comprising causing feedback, via the vehicle computing system, if the driver attempts a driving action that would likely bring the vehicle in contact with an object bearing the detected RFID tag.

11. The method of claim 10, wherein the feedback includes a warning.

12. The method of claim 10, wherein the feedback includes adding resistance to the attempted driving action.

13. The method of claim 12, wherein the attempted driving action is a turn.

14. The method of claim 12, wherein the attempted driving action is a lane shift.

15. A vehicle system, comprising:
an RF transceiver in communication with a processor, configured to detect the proximate presence of an RFID tag; and
wherein the processor is configured to:
determine a hazard type associated with the tag;
notify a driver of the presence of the determined type of potential hazard; and
add resistance against an attempted braking action that is determined to likely bring the vehicle in contact with the hazard.

16. The apparatus of claim 15, further comprising:
at least one feedback causing logic routine, stored in a memory of the vehicle computing system and executable by a processor of the vehicle computing system, operable to cause feedback if the driver attempts a driving action that would likely bring the vehicle in contact with an object bearing the detected RFID tag.

17. A non-transitory computer-readable storage medium, storing instructions that, when executed, cause a vehicle computing system to perform a method comprising:
detecting, through an RF transceiver the proximate presence of an RFID tag;
determining a type to which the detected tag corresponds;
notifying a driver of the hazard; and
adding resistance against an attempted braking action that is determined to likely bring the vehicle in contact with the hazard.

18. The computer programmable storage medium of claim 17, wherein the method further comprises:
causing feedback, via the vehicle computing system, if the driver attempts a driving action that would likely bring the vehicle in contact with an object bearing the detected RFID tag.

* * * * *